United States Patent
Buffington et al.

[19]

[11] Patent Number: 6,159,015

[45] Date of Patent: Dec. 12, 2000

[54] MULTI-DIMENTIONAL AWARENESS PROFILING METHOD

[76] Inventors: Sherry D. Buffington, 310 E. Northgate Dr., Irving, Tex. 75062; Gina E. Morgan, 331 Linkview Dr., Duncanville, Tex. 75116; Ronald S. Reiserer, 310 E. Northgate Dr., Irving, Tex. 75062

[21] Appl. No.: 09/092,894

[22] Filed: Jun. 8, 1998

[51] Int. Cl.[7] .................................................. G09B 19/00
[52] U.S. Cl. ........................................................... 434/236
[58] Field of Search .................................. 434/219, 236, 434/237, 238; 705/10, 11

[56] References Cited

U.S. PATENT DOCUMENTS

| | | | |
|---|---|---|---|
| 2,959,871 | 11/1960 | Honkavaara | 434/236 |
| 4,627,818 | 12/1986 | Von Fellenberg | 434/236 |
| 4,682,956 | 7/1987 | Krane | 434/237 |
| 5,551,880 | 9/1996 | Bonnstetter | 434/236 |
| 5,649,061 | 7/1997 | Smyth | 395/20 |
| 5,676,551 | 10/1997 | Knight | 434/236 |
| 5,692,750 | 12/1997 | Poole | 273/161 |
| 5,696,981 | 12/1997 | Shovers | 395/760 |
| 5,702,253 | 12/1997 | Bryce et al. | 434/236 |
| 5,743,742 | 4/1998 | Morrel-Samuels | 434/236 |
| 5,795,155 | 8/1998 | Morrel-Samuels | 434/107 |
| 5,961,332 | 10/1999 | Joao | 434/236 |
| 5,967,789 | 10/1999 | Segel et al. | 434/236 |
| 6,007,340 | 12/1999 | Morrel-Samuels | 434/236 |
| 6,012,051 | 1/2000 | Sammon, Jr. et al. | 706/52 |

FOREIGN PATENT DOCUMENTS

WO 92/20208  11/1992  WIPO .

OTHER PUBLICATIONS

"The Use of Psychophysiology to Assess Driver Status." *Ergonomics* 1993, vol. 36, No. 9, 1099–1110.

"A Voice–operated Response Unit for Use in the Psychological Assessment of Motor Impaired Subjects." J. Scott Richards, Tony L. Wilson, Philip R. Fine, and James T. Rogers, 1982.

*Primary Examiner*—Jacob K. Ackun
*Assistant Examiner*—John Edmund Rovnak
*Attorney, Agent, or Firm*—Richard C. Litman

[57] ABSTRACT

A method and system for measuring the development level of the natural temperament, degrees of positive and negative behaviors adopted by an individual, and reactionary pattern and style as predictors of the individual's current level of personal effectiveness. The method includes administering two separate profiling instruments, a temperaments type and a preferences type. The two are then correlated and adjusted to be congruent. A third instrument is used to assess positive and negative traits within each profile type.

3 Claims, 16 Drawing Sheets

C.O.R.E. Type Part 1

| ▲ | | ● | | ■ | | ▲ | |
|---|---|---|---|---|---|---|---|
| ❶ Adventurous | ❶ Direct | ❶ Dynamic | ❶ Intolerant | ❶ Arrogant | ❶ Daring | ❶ Forceful | |
| ❷ Skillful | ❷ Deliberate | ❷ Accurate | ❷ Antisocial | ❷ Resentful | ❷ Respectful | ❷ Grumpy | |
| ❸ Diplomatic | ❸ Behaved | ❸ Helpful | ❸ Withdrawn | ❸ Doubtful | ❸ Friendly | ❸ Fearful | |
| ❹ Optimistic | ❹ Dramatic | ❹ Outspoken | ❹ Fickle | ❹ Boisterous | ❹ Spirited | ❹ Fussy | |

| ▲ | | ■ | | ▲ | | ■ | |
|---|---|---|---|---|---|---|---|
| ❶ Frank | ❶ Boastful | ❶ Independent | | ❶ Driven | ❶ Sure | ❶ Controlling | |
| ❷ Thoughtful | ❷ Inflexible | ❷ Sensible | | ❷ Logical | ❷ Cautious | ❷ Stubborn | |
| ❸ Content | ❸ Uncertain | ❸ Steady | | ❸ Submissive | ❸ Amiable | ❸ Undirected | |
| ❹ Changeable | ❹ Forgetful | ❹ Exciting | | ❹ Passionate | ❹ Charming | ❹ Inattentive | |

| ■ | | ● | | ● | | ■ | |
|---|---|---|---|---|---|---|---|
| ❶ Determined | ❶ Clever | ❶ Authoritative | | ❶ Ambitious | | ❶ Headstrong | |
| ❷ Orderly | ❷ Punctual | ❷ Scheduled | | ❷ Introspective | | ❷ Condescending | |
| ❸ Easygoing | ❸ Courteous | ❸ Accommodating | | ❸ Sympathetic | | ❸ Distant | |
| ❹ Enthusiastic | ❹ Versatile | ❹ Spontaneous | | ❹ Talkative | | ❹ Disruptive | |

| ■ | | | | | | ● | |
|---|---|---|---|---|---|---|---|
| ❶ Abrupt | | | | | | ❶ Capable | |
| ❷ Contrary | | | | | | ❷ Controlled | |
| ❸ Indecisive | | | | | | ❸ Accepting | |
| ❹ Confused | | | | | | ❹ Sociable | |

FIG. 5a

Preferences Section 1

When RELATING TO OTHERS and THE WORLD AT LARGE, I tend to:

- ☐ A. Project my energy outward in an out-going, easily visible way.
- ☐ B. Keep my energy controlled in a fairly reserved way.

- ☐ A. Move toward activity and action.
- ☐ B. Stick to ideas and thoughts.

- ☐ A. Interact easily and don't mind crowds and noise.
- ☐ B. Avoid crowds and enjoy solitude.

- ☐ A. Express myself openly and expect others to do the same.
- ☐ B. Keep my thoughts to myself.

- ☐ A. Feel lonely or irritable fairly soon after being isolated from activity.
- ☐ B. Feel agitated and irritable fairly soon after being around a lot of activity.

- ☐ A. Act quickly and expediently after reviewing the facts.
- ☐ B. Think and ponder before taking action.

- ☐ A. Develop my ideas through discussion with others.
- ☐ B. Develop my ideas through contemplation.

- ☐ A. Enjoy meeting and talking to people in general.
- ☐ B. Keep my interactions confined to a few close friends.

- ☐ A. Be where the action is. I work effectively with activity or noise around me.
- ☐ B. Have my own space. To work effectively, I need relatively quiet surroundings.

- ☐ A. Speak my mind. I tend to speak before I think.
- ☐ B. Think things over. I tend to think before I speak.

- ☐ A. Prefer to work with people and things.
- ☐ B. Prefer to work with ideas and concepts.

- ☐ A. Enjoy surprises, like adapting to last minute changes.
- ☐ B. Dislike surprises, prefer to know what's going on.

*FIG. 6a*

- A. Separate myself from my ideas, realizing they are separate things.
- B. Identify with my ideas, realizing I am what I think.

- A. Talk rather than listen.
- B. Listen rather than talk.

- A. Easily and quickly share my experiences with others.
- B. Review my experiences internally before sharing them.

- A. Easily share my time and space.
- B. Require lots of time and personal space alone.

- A. Seek variety. I become impatient or bored when work is too repetitious.
- B. Seek stability. I become impatient or irritated when work is too unpredictable.

- A. Want excitement and freedom in special relationships.
- B. Want security and stability in special relationships.

- A. See an attack on my ideas or plans as no big deal.
- B. Get upset when others attack my ideas and plans.

- A. Consider the opinions of others before I act.
- B. Consider the principals behind an action before I act.

- A. Interact with others to gain insight.
- B. Seek solitude to clarify my thinking.

TOTAL A's _____ (CODE X)

TOTAL B's _____ (CODE N)

Transfer totals to Tally Part 1, Step 1 Section 1 on page 4

A. Like suggestions that are direct, practical and immediately applicable.
B. Like suggestions that are unusual, novel and challenging.

A. Prefer detailed descriptions.
B. Prefer to work with metaphors and analogies.

A. Prefer to receive and generally give specific information.
B. Prefer to receive and generally give brief overviews.

A. Like relationships that are constant and predictable.
B. Like adventure and change in relationships.

A. Maintain clear expectations and roles in relationships.
B. Keep roles and expectations flexible and negotiable.

A. Work methodically using past experience and observations to guide me.
B. Improvise to find new and better ways to do things.

6

A. Like schedules, timetables and specific deadlines.
B. Feel constrained by timetables, schedules and specific deadlines.

A. Plan my work.
B. Be spontaneous in my work.

A. Like making lists and checking things off when completed.
B. Ignore "to do" lists even if I make one out.

A. Need to finish current projects before starting new ones.
B. Put off current projects to start new ones.

TOTAL A's _____ (CODE S)

TOTAL B's _____ (CODE I)

Transfer totals to Tally Part 1, Step 2 Section 2 on page 4

*FIG. 7b*

Preferences Section3

When RECEIVING or PROCESSING INFORMATION I tend to:

- ☐ A. Keep truth and reality as my objective.
- ☐ B. Keep harmony and understanding as my objective.

- ☐ A. Make decisions with my head.
- ☐ B. Make decisions with my heart.

- ☐ A. Develop ideas mainly for their immediate usefulness.
- ☐ B. Develop ideas mainly for their possibilities.

- ☐ A. Deal with people in a firm, direct way.
- ☐ B. Deal with people gently and empathetically

- ☐ A. Be brief and concise in my communications.
- ☐ B. Be warm and friendly in my communications.

- ☐ A. Be task oriented.
- ☐ B. Be relationship oriented.

- ☐ A. Maintain harmony, but can work effectively without it.
- ☐ B. Need harmony to remain effective in my work.

- ☐ A. Remain calm and cool when everyone else is upset.
- ☐ B. Feel other people's pain and hurt along with them.

- ☐ A. Expect people to be sensible and act purposefully.
- ☐ B. Allow people room for flexibility, growth and change.

- ☐ A. Have specific notions as to what's right/wrong.
- ☐ B. Avoid assuming right or wrong and just let things flow.

*FIG. 8a*

- A. Look only at the pros and cons when considering alternatives.
- B. Consider people's needs before looking at the pros and cons.

☐

- A. Use logic and reason to convince others.
- B. Use warmth and enthusiasm to convince others.

☐

- A. Consider results and outcomes before people's feelings.
- B. Consider people's feelings before results and outcomes.

☐

- A. Prefer to work on tasks and impersonal information.
- B. Prefer to focus on people and their perceived needs.

☐

- A. Form and maintain relationships for logical, sensible reasons.
- B. Form and maintain relationships for caring, emotional reasons.

☐

- A. Take honesty over tactfulness.
- B. Take tactfulness over honesty.

☐

- A. Keep my feelings to myself.
- B. Express my feelings openly.

☐

- A. Postpone leisure activities until my work is done.
- B. Look for ways to combine work and play.

☐

- A. Develop values and relationships that make sense.
- B. Develop values and relationships that feel "right".

☐

- A. Decide quickly and move on.
- B. Delay decisions to seek options.

☐

- A. Look at how objects relate to and affect one another.
- B. Look at the value and importance of objects in and of themselves.

☐

TOTAL A's _____ (CODE T)

TOTAL B's _____ (CODE F)

Transfer totals to Tally Part 1, Step 2 Section 3 on page 4

Effectiveness Part 3

COMMANDER

A. ___ Demanding
B. ___ Deliberate
C. ___ Decisive

A. ___ Neglectful
B. ___ Nervy
C. ___ Noble

A. ___ Pushy
B. ___ Pretentious
C. ___ Purposeful

A. ___ Persecutor
B. ___ Powerful
C. ___ Practical

A. ___ Pompous
B. ___ Proud
C. ___ Prepared

A. ___ Rude
B. ___ Reactionary
C. ___ Reasonable

ORGANIZER

A. ___ Obstinate
B. ___ Opinionated
C. ___ Orderly

A. ___ Paranoid
B. ___ Perfectionistic
C. ___ Particular

A. ___ Radical
B. ___ Resistant
C. ___ Realistic

A. ___ Sarcastic
B. ___ Skeptical
C. ___ Serious

A. ___ Restrictive
B. ___ Reserved
C. ___ Respectful

A. ___ Petty
B. ___ Prankster
C. ___ Precise

RELATER

A. ___ Obedient
B. ___ Obliging
C. ___ Open

A. ___ Paralyzed
B. ___ Panicky
C. ___ Peaceful

A. ___ Doubtful
B. ___ Dull
C. ___ Docile

A. ___ Miserable
B. ___ Misunderstood
C. ___ Mediator

A. ___ Reclusive
B. ___ Resigned
C. ___ Receptive

A. ___ Needy
B. ___ Nervous
C. ___ Nurturing

ENTERTAINER

A. ___ Egotistical
B. ___ Exaggerator
C. ___ Eager

A. ___ Disruptive
B. ___ Disorganized
C. ___ Dramatic

A. ___ Reactionary
B. ___ Relentless
C. ___ Ready

A. ___ Loud
B. ___ Late
C. ___ Lively

A. ___ Pretentious
B. ___ Panicky
C. ___ Passionate

A. ___ Nosy
B. ___ Nervy
C. ___ Noticeable

*FIG. 9a*

A.___ Intolerant
B.___ Inpatient
C.___ Interested

A.___ Deceptive
B.___ Defensive
C.___ Decent

A.___ Worrier
B.___ Wary
C.___ Watchful

A.___ Excessive
B.___ Edgy
C.___ Entertaining

A.___ Workaholic
B.___ Willful
C.___ Wise

A.___ Testy
B.___ Tepid (Luke Warm)
C.___ Trustworthy

A.___ Uninspired
B.___ Uneasy
C.___ Understanding

A.___ Trivial
B.___ Talkative
C.___ Talented

A.___ Controlling
B.___ Competitive
C.___ Courageous

A.___ Unforgiving
B.___ Uncompromising
C.___ Unfailing

A.___ Consumed
B.___ Confused
C.___ Comforting

A.___ Lost
B.___ Lavish
C.___ Lively

A.___ Tactless
B.___ Tenacious
C.___ Triumphant

A.___ Stubborn
B.___ Systematic
C.___ Skillful

A.___ Timid
B.___ Tame
C.___ Tactful

A.___ Undisciplined
B.___ Unfocused
C.___ Upbeat

A.___ Unaffectionate
B.___ Unaware
C.___ Unaffected

A.___ Loathing
B.___ Loner
C.___ Logical

A.___ Indecisive
B.___ Inactive
C.___ Interested

A.___ Forgetful
B.___ Fickle
C.___ Fun-loving

A.___ Ruthless
B.___ Reckless
C.___ Resourceful

A.___ Contrary
B.___ Controlled
C.___ Careful

A.___ Lethargic
B.___ Lenient
C.___ Leisurely

A.___ Scattered
B.___ Sassy
C.___ Social

MULTI-DIMENTIONAL AWARENESS PROFILING METHOD

BACKGROUND OF THE INVENTION

1. Field of the Invention

The present invention relates to a multi-dimensional profiling procedure for measuring and evaluating an individual's basic personality traits and modes of functioning. More particularly, the present invention pertains to a profiling method and system for measuring the development level of the natural temperament, conditioned or nurtured preferences, degrees of positive and negative behaviors adopted by an individual, and reactionary pattern and style as predictors of the individual's current level of personal effectiveness.

2. Description of the Related Art

Currently, two distinct types of personality profiling methods are used. The first method assesses personality types or temperaments looking at natural inclinations. This method measures internal representations of the self. The second method assesses preferences looking at current functioning modes. This method measures external representations of the self. Often the two approaches have lead to inconsistent results even when administered to the same subject. A profiling method that correlates these two prevailing methods is therefore needed.

The first known personality delineation was created by Hippocrates (the father of medicine) and dates back to nearly 500 years B.C. Hippocrates described four basic personality types, which he coined "temperaments." He believed that the cause of the different behaviors could be traced to "humors," or bodily fluids, and he named the temperaments accordingly. He believed that the Commander type behaved aggressively because of an excess of yellow bile. His term for the Commander was Choleric. The Organizer was believed to have an excess of black bile and was called Melancholy. The Relater was believed to have an excess of phlegm, and so, was called Phlegmatic, while the Entertainer was believed to have an excess of blood, and was named Sanguine (which means red).

Although his assumptions as to the cause of differing personalities were incorrect, his descriptions of the four basic types were quite accurate and have been used in one form or another since that time. As a result, the four basic temperaments have to their credit more than two thousand years of research as to validity and reliability.

The second area has its roots in more recent history. The most notable work in the area of Preferences was done in the early nineteen hundreds by Swiss psychologist, Carl Gustav Jung. His work focused on the various ways people applied their natural inclinations and also on the ways in which they were able to alter their natural inclinations when the need arose. In 1921 Carl Jung published *Psychological Types*, which was translated into English and made available in the United States in 1923. Using the work of Jung as a basis, Katherine Briggs and her daughter Isabel Briggs-Myers developed a device for measuring preferences, called the Myers-Briggs Type Indicator, around 1930. Though an invaluable tool, some confusion has arisen as a result of the assumption that preferences are the same as in-born traits and do not change. However, preferences can and do change from time to time. Generally, when these preferential changes occur in adulthood they are either temporary and are made for specific, circumstantial purposes, or as a result of moving toward nature and away from incompatible nurturing or socialization. Alterations made as a result of moving from nurture to nature tend to be permanent, while those that are circumstantial can be either temporary or permanent, depending on the reason for the change and how strong the need to keep it is.

Most people choose and utilize the preferences that correspond to their basic tendencies, and alter these preferences only when necessary. An example of this is hand preference. Right handed people prefer their right hand over their left, but can and do use their left hand. Should their right arm be permanently disabled, they could learn to use the left hand in place of the right. How comfortable or effective the switch would become depends on how early in life it is made and how dedicated to effecting the change the individual is. Conversely, a broken arm, which heals in time, would require only a temporary change and as soon as the right hand was usable again, the individual would switch back to it. All preferences function in this same manner.

Other tests based on these and similar theories have been developed for many purposes. For example, U.S. Pat. No. 5,551,880, which issued to Bonnstetter et al. on Sep. 3, 1996, discloses a system for predicting the potential success of an individual for a particular job or task. The system includes a two part test involving a behavior questionnaire and a values questionnaire. Each questionnaire is tailored to the job sought. Answers are tabulated, recorded, and analyzed providing a report predicting probable success of the individual in a given job or task.

U.S. Pat. No. 5,595,981, which issued to Shovers on Dec. 9, 1997, discloses a personality analyzer. According to the invention, subject responses to a quiz or flashcards, are used to determine likely personality type. A monograph or monologue may also be used. Certain "key words" are given weights and assigned categories. The subjects use of these key words are tallied and summed. Analysis of the weighted scores gives insight into the subject's personality.

Other patents and publications, relating to personality or mental state, exist but are less related to the present invention. Among these are: U.S. Pat. No. 5,649,061 (device and method for estimating a mental decision) which issued to Smyth on Jul. 15, 1997; U.S. Pat. No. 5,676,551 (method and apparatus for emotional modulation of a human personality within the context of an interpersonal relationship) which issued to Knight et al. on Oct. 14, 1997; and PCT patent document WO 92/20208 published Nov. 26, 1992; "The Use of Psychophysiology to Assess Driver Status," *Ergonomics* 1993, vol. 36, no. 9, 1099–1110; and "A Voice-Status operated Response Unit for Use in the Psychological Assessment of Motor Impaired Subjects," J. Scott Richards, Tony L. Wilson, Philip R. Fine, and James T. Rogers, 1982.

Despite the existence of a variety of personality evaluation tests, there is still the need for a testing instrument that combines, correlates, and analyzes two prevailing theories of personality type that have heretofore been the subject of separate analyses. Furthermore, to gain more perspective on a subject's personality, a testing instrument is needed that also includes an effectiveness evaluation to aid the subject in determining how he or she may best modify, if necessary, behavior to become more effective.

None of the above inventions and patents, taken either singularly or in combination, is seen to describe the instant invention as claimed. Thus a multi-dimensional awareness profile solving the aforementioned problems is desired.

SUMMARY OF THE INVENTION

The present invention is a method and system for measuring the development level of the natural temperament and preferences of an individual, as well as conditioned or nurtured temperament and preferences, degrees of positive and negative behaviors adopted by an individual, and reactionary pattern and style as predictors of the individual's current level of personal effectiveness. The method includes administering two separate profiling instruments, a temperaments type and a preferences type. The two are then correlated and optionally adjusted to be congruent. A third instrument is used to assess positive and negative traits within each profile type. The results of the temperaments and preferences instruments are correlated to find if the individual is acting in a capacity consistent with his or her natural tendencies, or subject to childhood conditioning or nurturing away from natural tendencies. The results are then adjusted, after analysis, to be congruent with one another. After adjustment, the personal effectiveness instrument is administered to determine whether the individual is operating positively or negatively within his or her profile type. With heightened awareness, the individual is better able to adjust negative behaviors.

Accordingly, it is a principal object of the invention to correlate results from temperament and preference type profiling instruments.

It is another object of the invention to assess whether an individual is operating positively or negatively within his or her profile type.

It is a further object of the invention to provide a profiling instrument which is not easily skewed willfully by a subject.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 5a, 5b illustrate the questions of the temperaments instrument of the present invention.

FIGS. 6a, 6b illustrate the questions of the first part of the preferences instrument of the present invention.

FIGS. 7a, 7b illustrate the questions of the second part of the preferences instrument of the present invention.

FIGS. 8a, 8b illustrate questions of the third part of the preferences instrument of the present invention.

FIGS. 9a, 9b illustrate questions of the personal effectiveness instrument of the present invention.

FIG. 10 shows a scoresheet for recording and scoring answers to each section of the present invention.

FIG. 11 shows a completed scoresheet of the present invention.

Similar reference characters denote corresponding features consistently throughout the attached drawings.

DETAILED DESCRIPTION OF THE PREFERRED EMBODIMENT

Figure 1:
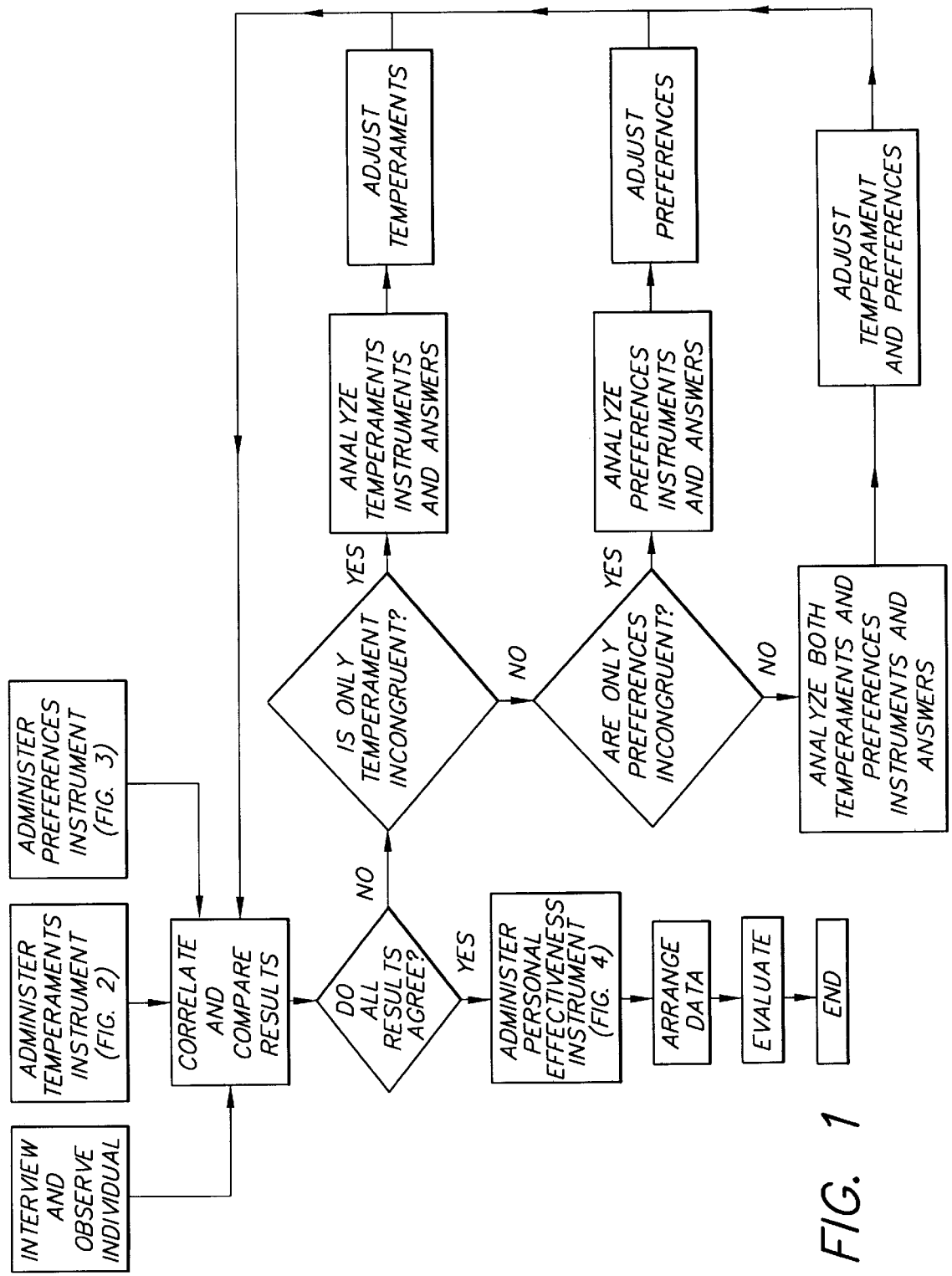
FIG. 1 is a flowchart outlining the method for implementing the profiling instruments of the present invention.
Figure 2:
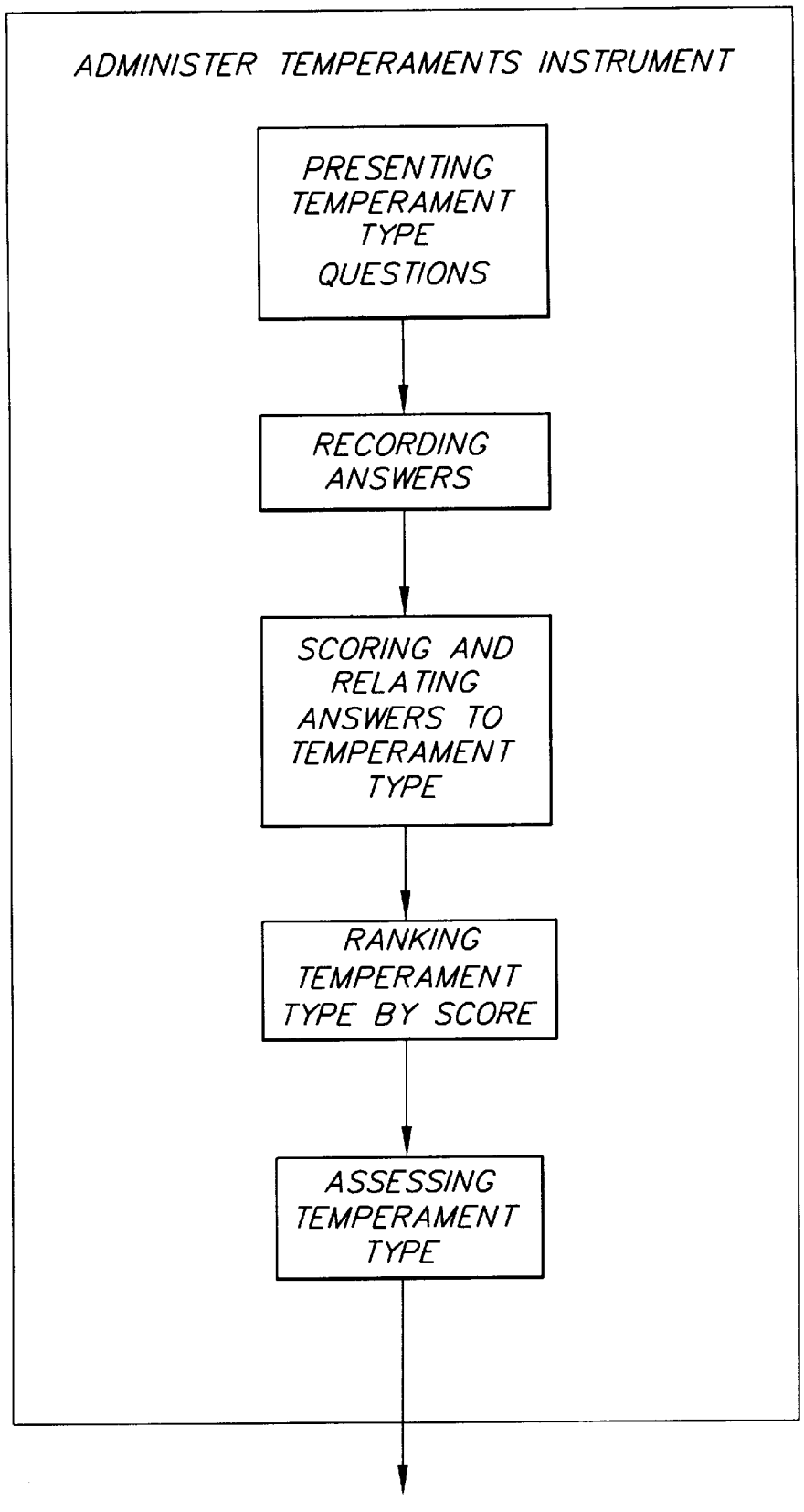
FIG. 2 is a flowchart outlining the method of administering the temperaments instrument of the present invention.
Figure 3:
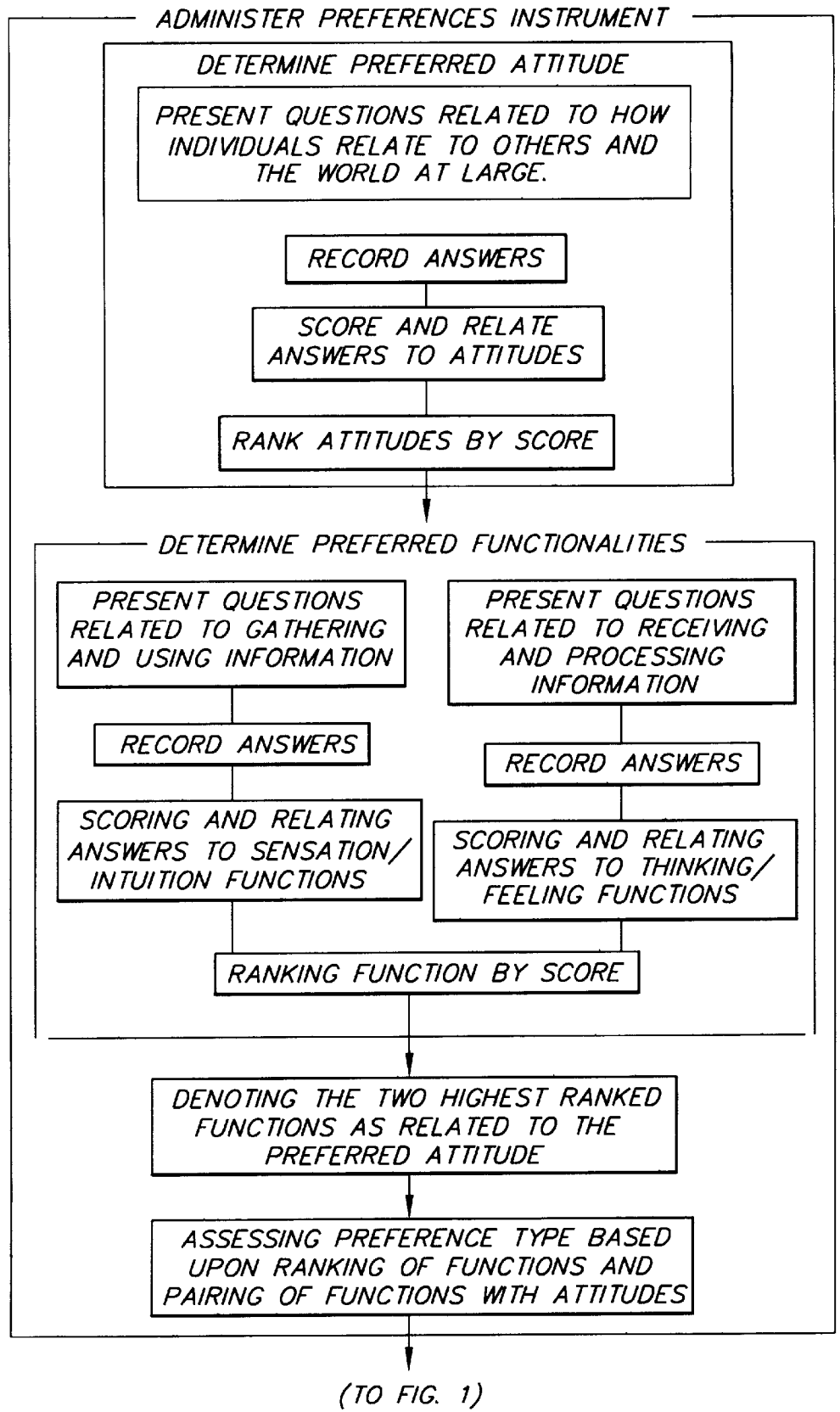
FIG. 3 is a flowchart outlining the method of administering the preferences instrument of the present invention.
Figure 4:
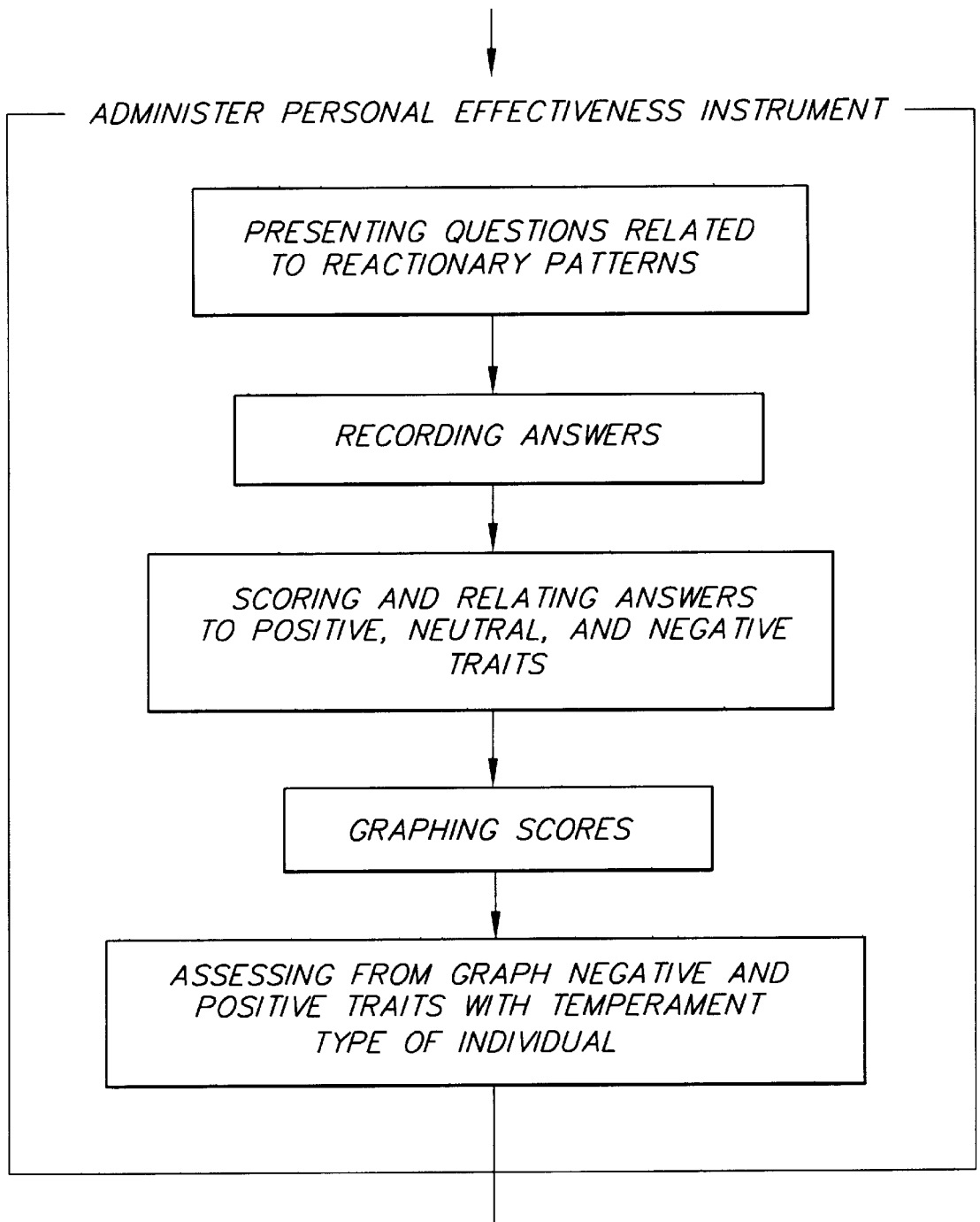
FIG. 4 is a flowchart outlining the method of administering the personal effectiveness instrument of the present invention.

A temperaments instrument based on the Hippocratic method of determining natural tendencies and a preferences instrument based on Jungian methods of measuring attitudes and functions are combined with an effectiveness instrument providing a method of measuring positive to negative traits, level of trait development, and reactionary styles. Together, a final type, dubbed the CORE type, is determined through the correlated combination of all of these measures.

In a preferred embodiment, the temperament type evaluation instrument and the preferences type evaluation instrument are coupled together with the personal effectiveness evaluation instrument. For optimal results and analysis, a personal interview may also be conducted for further comparison with an observed type. If the interview is not conducted however, the individual may benefit from a self-analysis. This profiling method also benefits from a multi-dimensional approach which not only correlates results of different instruments, but reduces the chance of results being willfully skewed by the individual being profiled.

Temperaments

The temperament instrument analyzes natural in-born tendencies. A plurality of questions, in the form of word sets or groupings, are first presented to the individual, see FIGS. 5a and 5b. Each set or grouping consists of four words each numbered one through four. The numbers correspond to one of the four temperament types (Commander, Organizer, Relater, and Entertainer) consistently throughout the instrument. The number assigned to the one word which the individual being profiled finds best describes him for each group is recorded. The choice of word may also be based on the word that describes the individual most often. Because each number is related to a specific temperament type, scoring the instrument consists merely of tallying the amount of each response by number. Each score is assigned to its corresponding temperament type with a letter C, O, R, and E. The temperament types are then ranked according to score from highest to lowest. The highest score indicates the dominant temperament type. The second highest represents the secondary type. Third and fourth rankings represent back-up and dormant temperaments, respectively. The temperament type of the individual is finally assessed by combining the dominant and secondary temperament types. In the example score sheet shown in FIG. 11 a temperament type of Organizer/Commander is illustrated. In this manner, the individual is assessed as being in one of sixteen categories. Four of those types are true types by more than 50% (i.e. greater than a 75/25 ratio), the remaining twelve types are combination types of a dominant and secondary temperament.

Preferences

The preferences instrument measures current functioning modes. Preferences may be skewed by present needs such as the need to cope with stress. Determining preferences requires the determination of a preferred attitude and preferred functions, and how they relate to one another.

Figure 11:
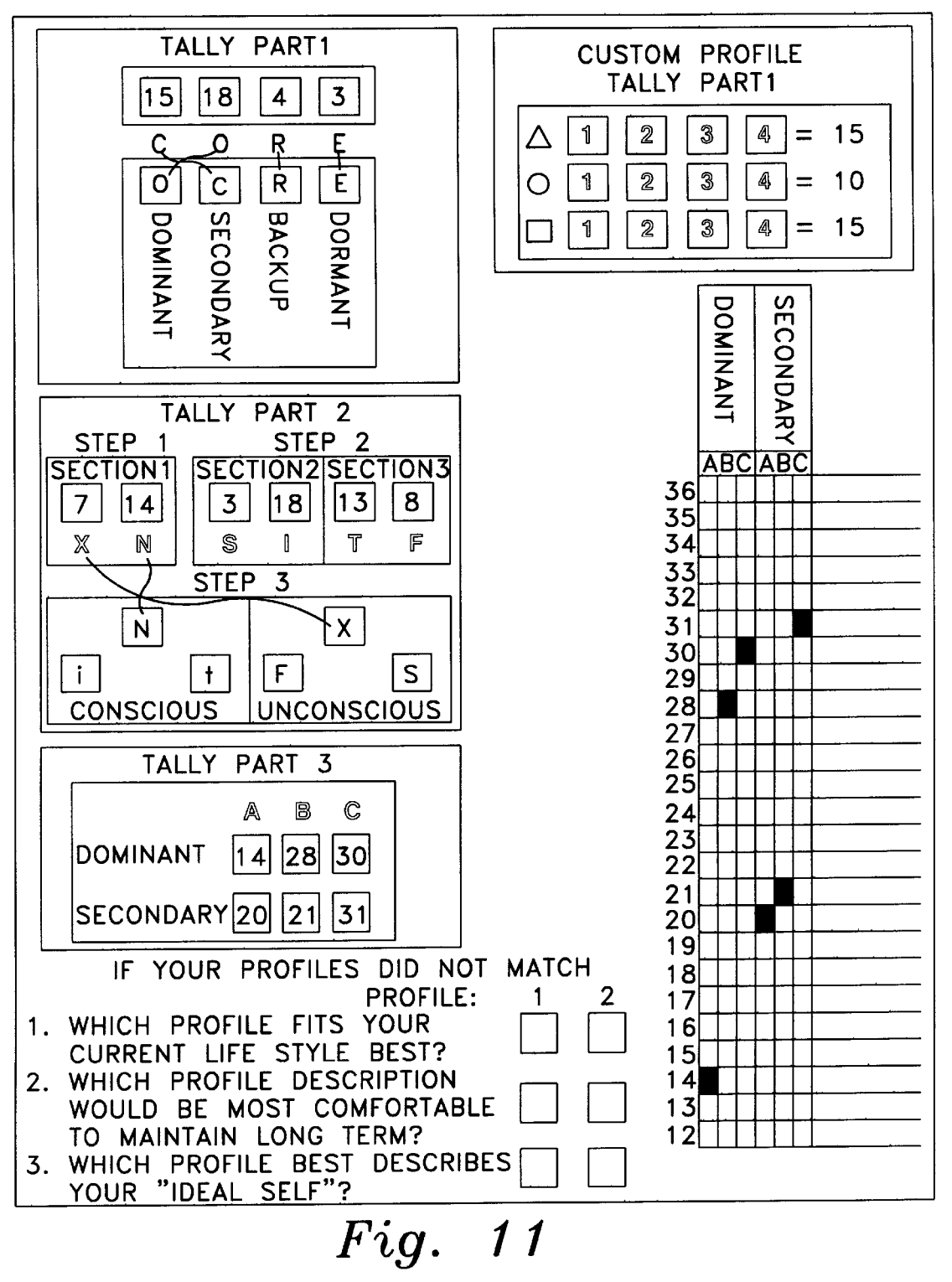

The two attitudes are introversion and extroversion. The determination of which attitude is preferred by the individual is begun by presenting a plurality of questions related to how the individual relates to others and the world at large, see FIGS. 6a and 6b. Pairs of substantially opposed statements are presented to the individual. Each statement is assigned a label. As in the case of FIGS. 6a and 6b, each is labeled either A or B. Throughout this instrument, each of these labels relates to one of the two attitudes. The individual then records the label of the statement that describes what the individual would choose most often. When answers to all the questions of this section are recorded, they may be scored and related to the two attitudes. In FIGS. 6a and 6b, all A answers are counted and assigned to the attitude of extroversion while all B answers are counted and assigned to the according to score. The higher ranked attitude is the preferred attitude. The example scoresheet shown in FIG. 11 shows a preferred introverted attitude. Next, the relationships of the four functions must be determined.

Figure 7A:

The four functions are arranged as opposed pairs, sensation and intuition, and thinking and feeling. Because of their opposed nature, the functions are used in either/or fashion. As such, they are evaluated in two parts. The first part is directed to how the individual gathers and uses information, which relates to the functions of sensation and intuition, FIGS. 7a and 7b. The second part is directed to how the individual receives and processes information, which relates to the functions of thinking and feeling, FIGS. 8a and 8b.

Both parts present a pair of opposed statements, each labeled A or B. The labels correspond to one of two opposed functions depending upon which part of the test is being taken. The label which corresponds to the choice the individual would make most often from each set of statements is then recorded. As with the attitude section, the answers are then scored and related according to function. This is done for both sets of questions so that scores are attained for each function. The functions are then ranked according to score from high to low. The two highest ranked functions are associated with the preferred attitude. In the example, this is done by writing the letter associated to the functions as lower case letters for introverted attitudes and in capital letters for the extroverted attitude. In the example of FIG. 11 the preferred attitude is introversion. The functions of intuition and thinking are associated with this attitude for this individual, and are therefore written in lower case letters. The letter combination, itFS in the example, FIG. 11, is compared to a predetermined list to assess a preferences type, shown in Table 1. The example, itFS, then corresponds to the Organizer/Entertainer preference type.

TABLE 1

Preferences Letter Ranking Combination and Preferences Type

TIsf - Extroverted TI, Introverted sf = True Commander
TSif - Extroverted TS, Introverted if = Commander/Organizer
STfi - Extroverted ST, Introverted fi = Commander/Relater
ITfs - Extroverted IT, Introverted fs = Commander/Entertainer
tsIF - Introverted ts, Extroverted IF = True Organizer
tiSF - Introverted ti, Extroverted SF = Organizer/Commander
stFI - Introverted st, Extroverted FI = organizer/Relater
itFS - Introverted it, Extroverted FS = organizer/Entertainer
fsIT - Introverted fs, Extroverted IT = True Relater
ifTS - Introverted if, Extroverted TS = Relater/Commander
sfTI - Introverted sf, Extroverted TI = Relater/Organizer
fiST - Introverted fi, Extroverted ST = Relater/Entertainer
FIst - Extroverted FI, Introverted st = True Entertainer
IFts - Extroverted 1F1 Introverted ts = Entertainer/Commander
SFti - Extroverted SF, Introverted ti = Entertainer/Organizer
FSit - Extroverted FS, Introverted it = Entertainer/Relater Correlation Once both Temperaments and Preferences types have been determined by administering the two instruments, the results must be correlated. Optimally, a personal interview will also have been conducted to serve as a guide post for analyzing and correlating the test results. The results may be compared to one another and or to the observed traits found on the interview.

If both the temperaments and preference instruments are congruent with each other, and the interview when done, the individual is aware of his or her natural tendencies and is operating with them, and not against them. No further correlation of results is needed. The individual may proceed to the Personal Effectiveness section of the profile.

If however, the two instruments are incongruent with each other or with the personal interview, optionally a further correlation will be made. If the optional correlation is not desired, the individual may proceed to the personal effectiveness section of the profile. If further correlation is desired the individual should read each type suggested by the results of the different instruments to discern which type, if either, more accurately represents the individual. When the personal interview has been conducted, the observed type serves as the basis of comparison. Once it has been determined which instrument is incorrect, each question may be analyzed to determine where the discrepancy arose. A more in-depth interview may also be conducted at this point to help determine reasons for the incongruence. An incongruence in the Temperaments instrument results is often a result of childhood conditioning which was contrary to the individual's nature or to long held erroneous beliefs about self. self rather than the natural self. Where the Preferences instrument appears skewed, it is usually a result of temporary changes in functioning which have been made to accommodate a current condition. In either case, once the incongruencies are found, the results of the instruments may be adjusted so that they are congruent. Discovering where the incongruencies lie help the individual assess and adapt behavior as necessary. Once the correct profile has been determined, the individual goes on to assess his or her personal effectiveness within that profile.

Personal Effectiveness

The present invention takes profiling one step further by helping the individual determine whether he or she is functioning negatively or positively within his or her profile type. This section of the profile measures Personal Effectiveness. The instrument is designed to assess how the individual reacts in different situations and at different stress levels. The individual is once again presented with a plurality of word sets, this time related to current behaviors and resulting reactionary patterns. As seen in FIGS. 9a and 9b each column of temperament types contains word sets which consist of three words labeled A, B, and C. Each word is ranked from one to three, three being the word that best describes the individual's current behavior. The individual's selections are recorded as a ranking within each word set. The selections are then scored, by label. This process is repeated only for the two profile types of the individual's profile. Each score is then graphed, see FIG. 11. Selections A, B and C corresponds to positive, neutral, and negative traits within the profile type. Analyzing the graph, and the distance between points on the graph gives the individual insight into how he or she is currently functioning and how the individual may become more effective given his or her profile type.

Custom Profiling Method

Figure 5B:
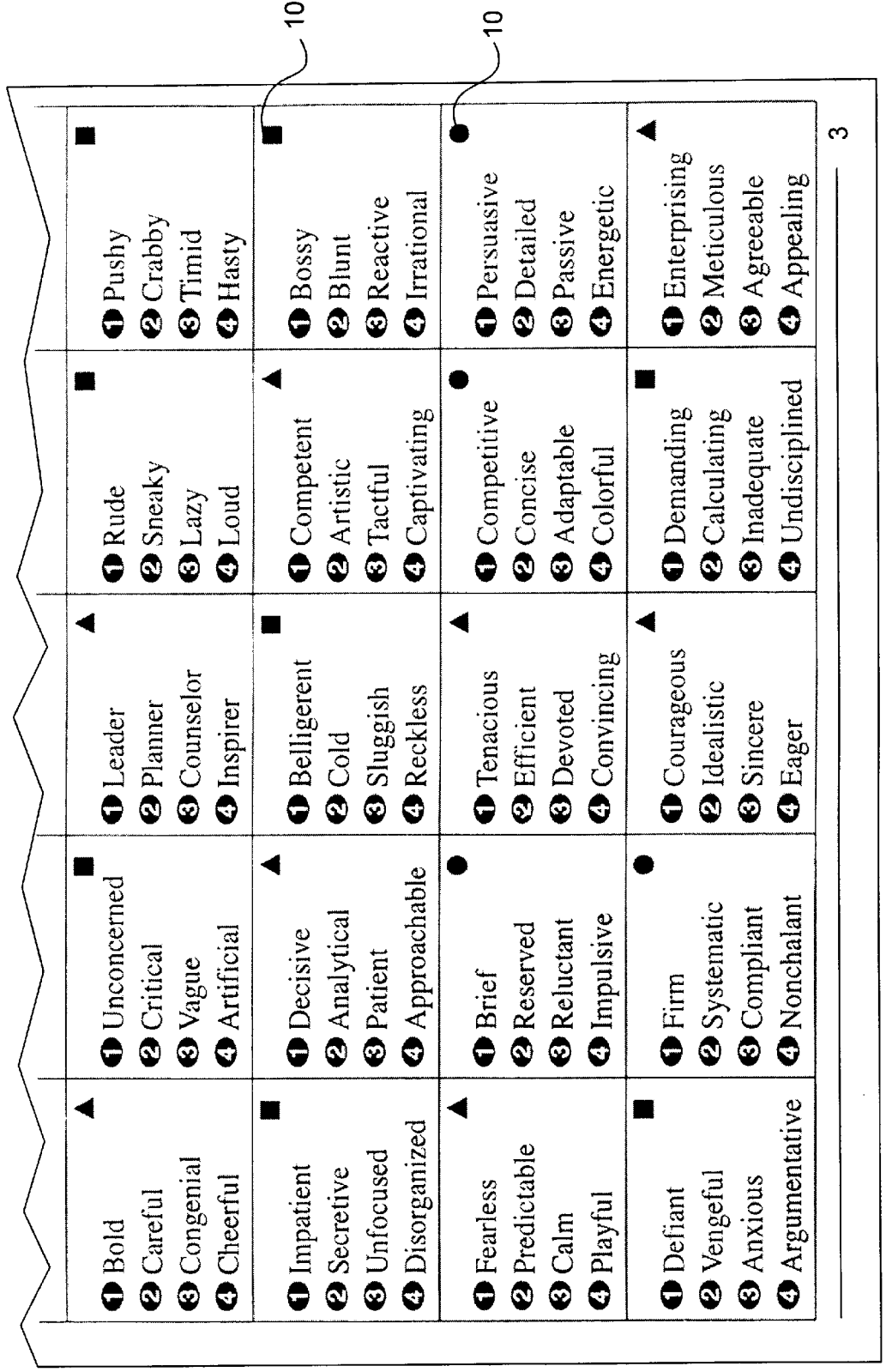
Figure 10:
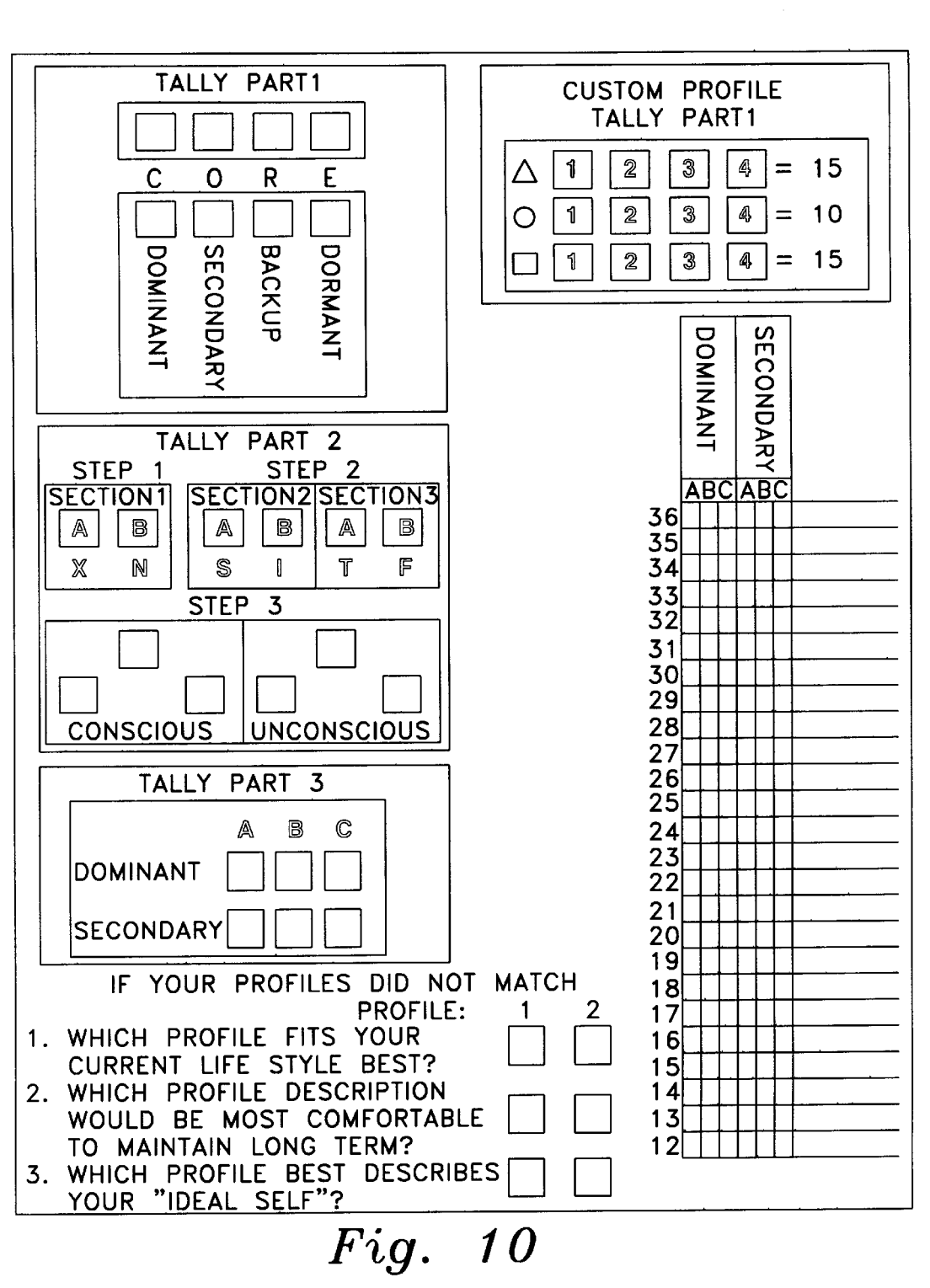

Each question of the temperaments instrument may further be provided with a symbol representing positive, neutral, and negative traits. These symbols are seen in FIGS. 5a and 5b, whereas an area for recording the results is seen in FIG. 10. Tallies of the responses corresponding to each symbol may be recorded for evaluation, along with the other responses, by trained professionals for further insight into the individual's profile.

The profiling instrument of the present invention assesses how the individual sees him or herself, how the individual reacts with and interprets the outside world, evaluates the strength of the individual's positive and negative traits. By analyzing and correlating these findings, the individual may discover how to develop natural tendencies and make the most of preferences by becoming aware of what those tendencies and preferences are.

It is to be understood that the present invention is not limited to the embodiments described above, but encompasses any and all embodiments within the scope of the following claims.

We claim:

1. A method of administering a personality profile to an individual comprising the steps of:
   a. determining a temperament type of the individual by:
      i. presenting to the individual a plurality of selected word groupings related to natural in-born tendencies, each of the word groupings consisting of four words;
      ii. recording selections by the individual from each of the word groupings;
      iii. scoring and relating the selections to four temperament types according to a predetermined grading scheme;
      iv. ranking temperaments according to the scoring from highest to lowest, the highest being a dominant temperament, next highest being a secondary temperament, next highest being a back-up temperament, and the lowest being a dormant temperament; and
      v. assessing temperament type as a combination of the two highest ranked temperaments;
   b. determining preferences type by:
      i. determining the preferred attitude of the individual by:
         (1) presenting to the individual a plurality of selected questions related to how the individual relates to others and the world at large;
         (2) recording answers to the questions;
         (3) scoring and relating the answers to two attitudes according to a predetermined grading scheme; and
         (4) ranking the answers according to the scoring from highest to lowest;
      ii. determining the preferred functionalities of the individual by:
         (1) presenting to the individual a first and a second set of a plurality of selected questions, the first set relating to how the individual gathers and uses information and the second set relating to how the individual receives and processes information;
         (2) recording answers to the first set of questions;
         (3) scoring and relating the answers from the first set of questions to a first pair of two opposed functions according to a predetermined grading scheme;
         (4) recording answers to the second set of questions;
         (5) scoring and relating the answers from the second set of questions to a second pair of the two opposed functions according to a predetermined grading scheme;
         (6) ranking the answers from the first and second sets of questions according to score from highest to lowest;
         (7) denoting the highest two functions as related to the preferred attitude, and the lower two functions as related to the remaining attitude; and
      iii. assessing preference type by comparing the combination of functions, as denoted by attitude, to a predetermined list corresponding to temperament type
   c. correlating results by:
      i. finding where temperament type and preferences type differ, if at all;
      ii. investigating reason for difference;
      iii. determining whether temperament type or preferences type is cause of difference;
   d. determining personal effectiveness within temperament and preference type by:
      i. presenting to the individual a plurality of selected word sets related to current behaviors;
      ii. recording the individual's selections from the word sets, as a ranking within each of the word sets;
      iii. scoring and relating the selections according to a predetermined grading scheme;
      iv. graphing scores for each selection type to provide a graph;
      v. assessing from the graph negative and positive traits within each temperament and preference type; and
   e. analyzing results of steps a, b and d for insight on how to modify behavior.

2. The method as defined by claim 1 wherein said four temperament types include Commander, Organizer, Relater, and Entertainer types.

3. The method according to claim 1 wherein:
   a. said two attitudes are introversion and extroversion; and
   b. said functionalities are based upon the opposed pairing of sensation with intuition and thinking with feeling functions.

* * * * *